United States Patent
Sugawara et al.

(10) Patent No.: US 11,313,692 B2
(45) Date of Patent: Apr. 26, 2022

(54) NAVIGATION SERVER AND NAVIGATION SYSTEM

(71) Applicant: HONDA MOTOR CO., LTD., Tokyo (JP)

(72) Inventors: Aiko Sugawara, Tokyo (JP); Takuro Masuda, Tokyo (JP); Hiroshi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 403 days.

(21) Appl. No.: 15/251,054

(22) Filed: Aug. 30, 2016

(65) Prior Publication Data
US 2017/0059345 A1    Mar. 2, 2017

(30) Foreign Application Priority Data

Sep. 1, 2015 (JP) .............................. JP2015-172375
Oct. 23, 2015 (JP) .............................. JP2015-209413

(51) Int. Cl.
*G01C 21/34* (2006.01)
*H04L 67/12* (2022.01)

(52) U.S. Cl.
CPC .......... *G01C 21/3492* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 8,666,716 | B2* | 3/2014 | Yonekawa | G08G 1/166 703/8 |
| 9,460,616 | B1* | 10/2016 | Miyahira | G08G 1/0112 |
| 9,467,839 | B1* | 10/2016 | Nishimura | G06F 16/29 |
| 9,696,170 | B2* | 7/2017 | Tanizaki | G01C 21/3492 |
| 9,870,001 | B1* | 1/2018 | Mangal | B60W 50/08 |
| 9,958,283 | B2* | 5/2018 | Anastassov | G01C 21/3492 |

(Continued)

FOREIGN PATENT DOCUMENTS

| | | |
|---|---|---|
| JP | 2004-220574 A | 8/2004 |
| JP | 2004-325357 A | 11/2004 |

(Continued)

OTHER PUBLICATIONS

Translation of JP 2011085431 (Kenichiro et al.) (Year: 2011).*

(Continued)

*Primary Examiner* — Christian Chace
*Assistant Examiner* — Michael F Whalen
(74) *Attorney, Agent, or Firm* — Squire Patton Boggs (US) LLP

(57) ABSTRACT

Provided is a navigation server or the like capable of promoting enhancement of convenience in traffic of moving bodies with a comprehensive consideration of various factors of each link. There is found a server route R configured by link groups that connect a starting point $p_1$ and a destination point $p_2$ of a navigation client 2 of interest, the server route R having a minimum total value $\Sigma C_2$ of second moving costs $C_2$ in the link groups. The second costs $C_2$ result from first moving costs $C_1$ corrected based on various factors, such as combinations of "static factors" and "dynamic factors".

11 Claims, 7 Drawing Sheets

(56) References Cited

U.S. PATENT DOCUMENTS

| | | | |
|---|---|---|---|
| 10,222,223 B2* | 3/2019 | Murata | G01C 21/3676 |
| 10,336,341 B2* | 7/2019 | Asakura | G05D 1/0088 |
| 2006/0082472 A1* | 4/2006 | Adachi | G08G 1/096716 |
| | | | 340/995.13 |
| 2010/0114469 A1* | 5/2010 | Chao | G01C 21/3484 |
| | | | 701/532 |
| 2010/0174482 A1* | 7/2010 | Sugawara | G01C 21/00 |
| | | | 701/517 |
| 2010/0209881 A1* | 8/2010 | Lin | G09B 19/167 |
| | | | 434/65 |
| 2010/0209882 A1* | 8/2010 | Lin | G09B 19/167 |
| | | | 434/65 |
| 2010/0209883 A1* | 8/2010 | Chin | G09B 19/167 |
| | | | 434/65 |
| 2010/0209884 A1* | 8/2010 | Lin | G09B 19/167 |
| | | | 434/65 |
| 2010/0209885 A1* | 8/2010 | Chin | G09B 19/167 |
| | | | 434/65 |
| 2010/0209886 A1* | 8/2010 | Lin | G09B 19/167 |
| | | | 434/65 |
| 2010/0209887 A1* | 8/2010 | Chin | G09B 19/167 |
| | | | 434/65 |
| 2010/0209888 A1* | 8/2010 | Huang | G09B 19/167 |
| | | | 434/65 |
| 2010/0209889 A1* | 8/2010 | Huang | G09B 19/167 |
| | | | 434/65 |
| 2010/0209890 A1* | 8/2010 | Huang | G09B 9/05 |
| | | | 434/65 |
| 2010/0209891 A1* | 8/2010 | Lin | G09B 19/167 |
| | | | 434/66 |
| 2010/0209892 A1* | 8/2010 | Lin | G09B 19/167 |
| | | | 434/71 |
| 2012/0209524 A1* | 8/2012 | Okude | G01C 21/343 |
| | | | 701/540 |
| 2013/0158849 A1* | 6/2013 | Maura | G01C 21/3697 |
| | | | 701/123 |
| 2013/0204528 A1* | 8/2013 | Okude | G08G 1/096822 |
| | | | 701/533 |
| 2016/0205238 A1* | 7/2016 | Abramson | G01C 21/3484 |
| | | | 455/456.4 |
| 2016/0265923 A1* | 9/2016 | Fukushima | G01C 21/34 |
| 2016/0334236 A1* | 11/2016 | Mason | G01C 21/3492 |
| 2016/0371975 A1* | 12/2016 | Yamamoto | G08G 1/0141 |
| 2017/0012812 A1* | 1/2017 | Gotoh | H04W 4/027 |
| 2017/0052036 A1* | 2/2017 | Uno | G01C 21/3492 |
| 2017/0178504 A1* | 6/2017 | Gotoh | G08G 1/0133 |
| 2017/0178505 A1* | 6/2017 | Ishikawa | G08G 1/09 |
| 2017/0262790 A1* | 9/2017 | Khasis | G05D 1/0287 |
| 2017/0343369 A1* | 11/2017 | Anastassov | G01C 21/3492 |
| 2017/0350715 A1* | 12/2017 | Tanizaki | G01C 21/34 |
| 2018/0052002 A1* | 2/2018 | Delling | G01C 21/3492 |
| 2018/0103888 A1* | 4/2018 | Cogill | A61B 5/18 |
| 2018/0178807 A1* | 6/2018 | Murata | B60W 50/082 |
| 2018/0348002 A1* | 12/2018 | Aggarwal | G01C 21/3461 |
| 2018/0372856 A1* | 12/2018 | Akiyama | G08G 1/0129 |
| 2018/0374344 A1* | 12/2018 | Akiyama | G08G 1/143 |
| 2018/0374353 A1* | 12/2018 | Hosokawa | G08G 1/162 |
| 2018/0374357 A1* | 12/2018 | Hosokawa | G06F 16/29 |
| 2019/0077413 A1* | 3/2019 | Kondo | B60W 50/0098 |
| 2019/0094034 A1* | 3/2019 | Aist | G01C 21/3469 |

FOREIGN PATENT DOCUMENTS

| | | |
|---|---|---|
| JP | 2009-008805 A | 1/2009 |
| JP | 2011-085431 A | 4/2011 |
| JP | 2013011450 A * | 1/2013 |
| WO | WO 2009/008138 A1 | 1/2009 |
| WO | WO 2009/044497 A1 | 4/2009 |

OTHER PUBLICATIONS

Office Action dated Sep. 18, 2018 corresponding to Japanese Patent Application No. 2015-172375.

Office Action dated Sep. 25, 2018 corresponding to Japanese Patent Application No. 2015-209413.

* cited by examiner

FIG.6

| FIRST CORRELATION COEFFICIENT $B1(C1(i1),C1(i2))$ | | FIRST INDEX VALUE $C1(i1)$ | | |
|---|---|---|---|---|
| | | 1 | 2 | 3 |
| FIRST INDEX VALUE $C1(i2)$ | 1 | $1-\alpha 11$ | 1 | 1 |
| | 2 | 1 | $1-\alpha 22$ | 1 |
| | 3 | 1 | 1 | $1-\alpha 33$ |

FIG.7A

| SECOND CORRELATION COEFFICIENT B2(C1(i),C2(i)) | | FIRST INDEX VALUE C1(i) | | |
|---|---|---|---|---|
| | | 1 | 2 | 3 |
| SECOND INDEX VALUE C2(i) | 1 | 1-$\beta$11 | 1 | 1 |
| | 2 | 1 | 1-$\beta$22 | 1 |
| | 3 | 1 | 1 | 1-$\beta$33 |

FIG.7B

| SECOND CORRELATION COEFFICIENT B2(C1(i),C2(i)) | | FIRST INDEX VALUE C1(i) | | |
|---|---|---|---|---|
| | | 1 | 2 | 3 |
| SECOND INDEX VALUE C2(i) | 1 | 1-$\beta$11 | 1 | 1 |
| | 2 | 1-$\beta$21 | 1-$\beta$22 | 1 |
| | 3 | 1-$\beta$31 | 1-$\beta$32 | 1 |
| | 4 | 1 | 1-$\beta$42 | 1-$\beta$43 |
| | 5 | 1 | 1 | 1-$\beta$53 |

NAVIGATION SERVER AND NAVIGATION SYSTEM

BACKGROUND OF THE INVENTION

Field of the Invention

The present invention relates to a navigation server to assist movement of each of plural moving stations based on communication with each navigation client as each of the plural moving stations.

Description of the Related Art

There has been proposed a navigation server that rapidly generates appropriate guidance assist information in light of traffic conditions in a road section after an accidental event occurs in this road section, and causes a navigation device to recognize the generated information (see International Publication No. WO2009/044497). There has also been proposed a navigation server capable of accurately estimating a transition cost from one link to each of other links, and assisting guidance of a moving body by a navigation device based on results of the above estimation (see International Publication No. WO2009/008138).

Unfortunately, for a user of a moving body, such as a vehicle, a driving difficulty level in each link for the user, in particular, in each link including an area unfamiliar to the user for driving is often influenced and becomes unstable due to not only a moving cost but also various factors in each link.

An object of the present invention, which has been made in order to solve the problems according to the conventional art, is to provide a navigation server and the like capable of promoting enhancement of convenience in traffic of moving bodies while comprehensively considering various factors in each link.

SUMMARY OF THE INVENTION

A navigation server of the present invention includes: a server storage unit which stores server map information regarding roads described by plural links, and respective first moving costs of the plural links; a first server arithmetic processing element that corrects the first moving costs stored in the server storage unit based on factors influencing respective traffic difficulty levels of the plural links so as to set second moving costs; and a second server arithmetic processing element that transmits the server map information stored in the server storage unit and information based on the second moving costs set by the first server arithmetic processing element to a navigation client.

According to the navigation server of the present invention, the information based on the second moving cost in each link included in the server map information is transmitted to the navigation client. The "second moving cost" results from the "first moving cost" corrected based on the "factors" that influence the traffic difficulty level for each of the plural links.

Accordingly, compared with the server route so found as to simply minimize a total value of the first moving costs, it is possible to provide a user with more appropriate information via the navigation client by considering the above factors, in light of driving facility when the user moves the moving body. Consequently, there is promoted enhancement of convenience for the user to move the moving body.

BRIEF DESCRIPTION OF THE DRAWINGS

FIG. 6 is a drawing explaining an embodiment example of correlation coefficients;

FIG. 7A and FIG. 7B are drawings explaining other correlation coefficients, in which FIG. 7A explains a first embodiment example of other correlation coefficients, and FIG. 7B explains a second embodiment example of other correlation coefficients.

DETAILED DESCRIPTION OF THE PREFERRED EMBODIMENTS

First Embodiment

Configuration

Figure 1:
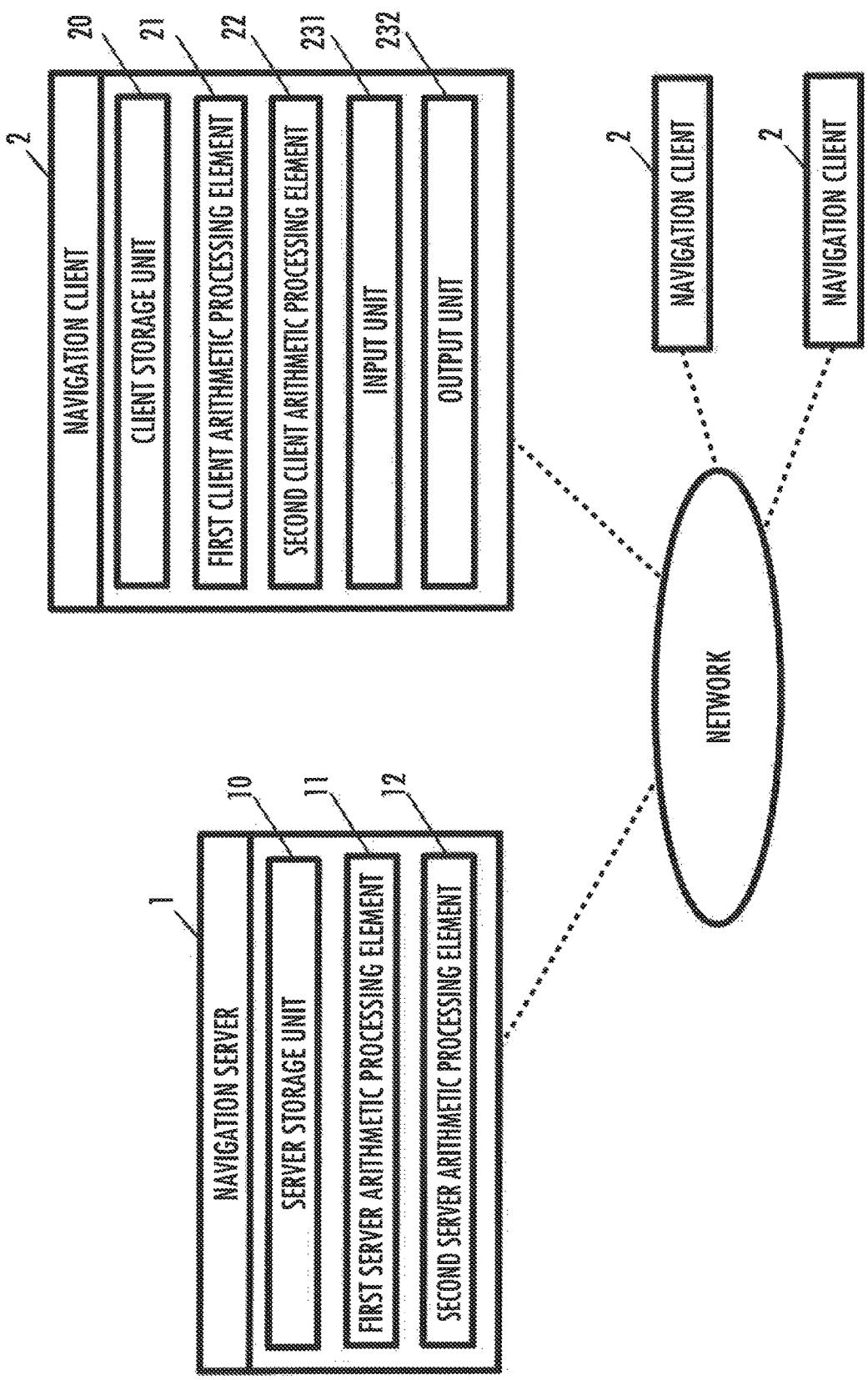
FIG. 1 is a drawing explaining a configuration of a navigation system as a first embodiment of the present invention.

A navigation system as shown in FIG. 1 as a first embodiment of the present invention includes a navigation server 1 and plural navigation clients 2. The navigation server 1 and the plural navigation clients 2 are mutually communicable via one or plural networks. Each navigation client 2 is configured to be temporarily or permanently installed in a moving body that is an apparatus having a function of moving in accordance with user's operation, such as a four-wheeled motor vehicle, a two-wheeled motor vehicle, and a bicycle.

(Configuration of Navigation Server)

The navigation server 1 includes a server storage unit 10, a first server arithmetic processing element 11, and a second server arithmetic processing element 12.

The server storage unit 10 is configured to store arithmetic processing results, such as, received information and calculation results generated by the first server arithmetic processing element 11 and the second server arithmetic processing element 12, respectively. The server storage unit 10 is configured to store server map information, road traffic information, and others. The "server map information" includes strings of coordinate values ((latitudes, longitude) or (latitudes, longitude, altitudes)) regarding locations, shapes, and postures of links constituting roads as well as link identifying information to identify each link. Two adjacent links are connected to each other via a node. The "road traffic information" includes a first moving cost $S_1(k)$ and a second moving cost $S_2(k)$ in each link $L(k)$, and others.

The road traffic information includes $N_1 (N_1=1, 2, \ldots)$ static factors. The "static factors" include types of roads (classification into general roads, highways, urban automobile roads (such as Tokyo Expressways), urban local roads, and hillside roads), width of links, the number of lanes, presence of opposite lanes, presence of structures on roadsides such as safety fences between roads and sidewalks, presence of crossing an opposite lane and or turning to the right (or to the left) when entering a subsequent link, the number of road traffic signs and road traffic rules, and others.

The respective static factors are represented by $N_1$ static variables $X_i (i=1, 2, \ldots, N_1)$. Each static variable $X_i$ is defined as a discrete variable or a continuous variable. For example, a static variable $X_{i1}(i=i1)$ representing a "type of road" that is a static factor is defined as a discrete variable, such as a "general road" of "0.5", an "expressway" of "1.0", and an "urban automobile road" of "1.5", or the like. A static variable $X_{i2}(i=i2)$ representing "presence of crossing an opposite lane when entering a subsequent link" is defined as a binary variable, such as "0 (none)" and "1 (present)".

The server storage unit 10 further stores $N_2(N_2=1, 2, \ldots )$ dynamic factors. The "dynamic factors" include elements regarding climates (e.g., fine, cloudy, rainy, snowy, thunder, a wind direction, a wind velocity, temperature, an atmospheric pressure, humidity, etc.), seasons (classification into a warm season and a cold season, classification into a dry season and a rainy season), time zone in a day (classification into day time and night time), etc. The dynamic factors are provided to the navigation server 1 from an external information source, such as a weather information service center, and may also be provided to the navigation server 1 from the navigation clients 2.

The respective dynamic factors are represented by $N_2$ dynamic variables $Y_j(j=1, 2, \ldots , N_2)$. Each dynamic variable $Y_j$ is defined as a discrete variable or a continuous variable. For example, a dynamic variable $Y_{j1}(j=j1)$ representing a "weather" that is a dynamic factor is defined as a discrete variable, such as "fine" of "0.5, "cloudy" of "1", and "rainy" of "2". A dynamic variable $Y_{j2}(j=j2)$ representing a "temperature" that is a dynamic factor is defined as a discrete variable expressed in increments of 0.1 by using a value (e.g., "20.2" indicating 20.2° C.) of a Celsius temperature (or a Fahrenheit temperature).

A combination of static factors and dynamic factors is defined by using a N-dimensional vector $(N=N_1+N_2)Q^\wedge = (X_1, \ldots X_i, \ldots X_{N1}, Y_1, \ldots Y_j, \ldots YN_2)$ which is based on elements of static variables $X_i$ and dynamic variables $Y_j$.

Each of the first server arithmetic processing element 11 and the second server arithmetic processing element 12 includes an arithmetic processor (CPU) that reads out software and data from a specified area of a memory included in the server storage unit 10 if necessary, and executes a specified arithmetic processing on the data in accordance with the software, and further includes communication equipment, a storage unit (memory), and others. The specified arithmetic processing will be described later in details.

(Configuration of Navigation Client)

Each navigation client 2 is configured by a portable-type terminal device, such as a smart phone and a tablet. The "portable-type" denotes a dimension as small as a standard human-hand size with a weight light enough to be easily carried by one hand or in a pocket of a cloth, or the like. Each navigation client 2 may be configured by equipment having a larger dimension and a heavier weight (e.g., equipment assembled to a moving body) rather than portable-type equipment.

Each navigation client 2 includes a client storage unit 20, a first client arithmetic processing element 21, and a second client arithmetic processing element 22.

The client storage unit 20 is configured to store received information and arithmetic processing results such as calculation results by the first client arithmetic processing element 21 and the second client arithmetic processing element 22. The client storage unit 20 is configured to store client map information, contents, and others. The "client map information" includes coordinate strings representing locations, shapes, and postures of respective links configuring roads, and others, as well as link identifying information used for identifying each link.

The client map information may include no coordinate strings, but may include image information used for displaying a map on an output unit 232, and link identifying information regarding the links configuring the roads included in this map. In this case, from coordinate values included in the server map information, the navigation server 1 identifies coordinate values that coincide with coordinate values included in probe information or request information, thereby identifying link identifying information or a type of the road corresponding to the identified coordinate values.

Even if the client map information and the server map information have different definitions of coordinate strings and others because of different specifications and data structures between the client map information and the server map information, it becomes possible to carry out link matching by applying common link identifying information to identical links. The navigation server 1 transmits server route information including the link identifying information, and each navigation client 2 displays, via an output unit 232, an image of a navigation route including plural links identified based on the link identifying information included in the route information.

The "contents" include visually recognized contents such as image contents (static images and moving images), as well as aurally recognized contents such as acoustic contents (music pieces and operating sounds, etc.), and entertainment contents in combination of the above contents. The image contents include part of the client map information, and the client route displayed while being superimposed on the client map information.

The first client arithmetic processing element 21 is configured to successively measure a current position $p_1$ of each navigation client 2. The current position $p_1$ is measured based on a signal received from an artificial satellite by a GPS receiver, and or based on an output signal from a gyro sensor if necessary. The first client arithmetic processing element 21 is configured to transmit "probe information" representing a time sequence of the position $p_1$ of the navigation client 2 to the navigation server 1.

The second client arithmetic processing element 22 is configured to transmit a request to the navigation server 1, and receive the "server route information" from the navigation server 1 in response to this request. Based on the server route information, the second client arithmetic processing element 22 is configured to find a client route using the client map information.

Each navigation client 2 further includes an input unit 231 and an output unit 232. The input unit 231 is configured by operating buttons and a microphone, and allows various operations or input settings by user's operation or utterance. The output unit 232 is configured by a display unit and a sound output unit (speaker), and displays an image content or outputs a sound content, such as the client map information. The input unit 231 and the output unit 232 may be configured by a touch panel-type display device, etc.

To "output" information by one component of the present invention denotes to output information in any form, such as display, a sound output, and a vibration output of the above information, which is perceivable by human five senses, such as a visual sense, an auditory sense, and a tactile sense, or the like. That one component of the present invention is "configured" to execute an assigned arithmetic processing means that the one component has a function to, that is, is so programmed as to read out a necessary program and data from a memory, and execute the assigned arithmetic processing based on the data, and in accordance with the above program.

(Functions)

Functions of the navigation system as the first embodiment of the present invention will be described. In each of (many and unspecified) navigation clients 2, the first client arithmetic processing element 21 generates the probe information, and transmits this to the navigation server 1 (STEP210 in FIG. 2). The "probe information" includes a time sequence of measurement results of the current position (or the link identifying information corresponding to the measurement results) of each navigation client 2. For example, a current transmission of the probe information is triggered when a specified time period passes from a previous transmission of the probe information, when a moving distance of the moving body reaches a specified distance from a previous transmission of the probe information, or when information volume of the probe information reaches a predetermined volume, or the like.

Some dynamic factors (e.g., outdoor temperature, humidity, weather, etc.) detected based on output signals of a sensor installed in each navigation client 2 or the moving body may be included in (or may be added to) the "probe information". Identifying information to identify each navigation client 2 or the moving body in which this navigation client 2 is installed may also be included in the "probe information".

Figure 2:
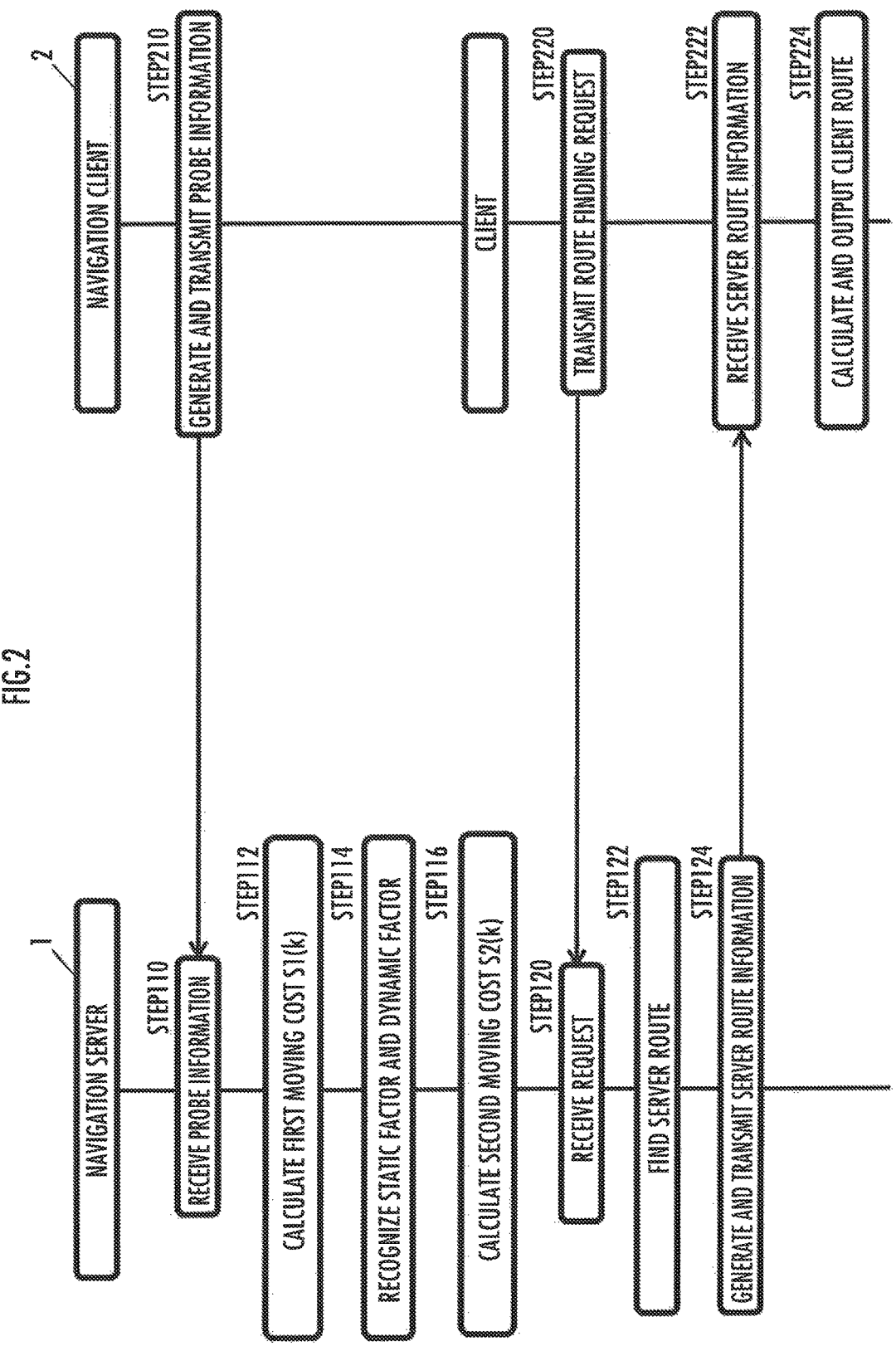
FIG. 2 is a drawing explaining functions of the navigation system of the first embodiment.

In the navigation server 1, the first server arithmetic processing element 11 receives the probe information from a first navigation client 2(i1) of interest (STEP110 in FIG. 2). Based on the probe information accumulatively stored in the server storage unit 10, the first server arithmetic processing element 11 successively calculates or updates a first moving cost $S_1(k)$ of each link L(k) (STEP112 in FIG. 2). Time required for moving, a moving distance, fuel consumption, electricity consumption, and or a toll charge fee that are measured in the link L(k) or predicted based on the measurement results, or combinations of them are defined as the first moving cost $S_1(k)$ of this link L(k). In calculation of the first moving cost $S_1(k)$, road traffic information received by the navigation server 1 from a server (not shown) managed by a road traffic information center may additionally be used.

The first server arithmetic processing element 11 reads out static factors and dynamic factors of the link L(k) from the server storage unit 10 (STEP114 in FIG. 2). Specifically, an N-dimensional vector $Q\hat{}(k)=(X_1(k), \ldots X_i(k), \ldots X_{N1}(k), Y_1(k), \ldots Y_j(k), \ldots Y_{N2}(k))$ is recognized.

Based on the static factors and the dynamic factors of the link L(k), the first server arithmetic processing element 11 corrects the first moving cost $S_1(k)$ stored in the server storage unit 10, and sets this corrected link to be a second moving cost $S_2(k)$ (STEP116 in FIG. 2). Specifically, a correction coefficient a(k) is set in accordance with a multivariable function $f(X_1(k), \ldots X_i(k), \ldots X_{N1}(k), Y_1(k), \ldots Y_j(k), \ldots Y_{N2}(k))$ having respective elements $X_1(k), \ldots X_i(k), \ldots X_{N1}(k), Y_1(k), \ldots Y_j(k), \ldots Y_{N2}(k)$ of the vector $Q\hat{}(k)$ as master variables. For example, the correction coefficient a(k) is set depending on an area including a point represented by the vector $Q\hat{}(k)$, among plural areas defined in the N-dimensional space. Alternatively, a value of the correction coefficient a(k) may be set depending on a length of a norm $|Q\hat{}(k)|$ of the vector $Q\hat{}(k)$.

Furthermore, with reference to one link L(m) continued to the link L(k), a correction coefficient a(k,m) may be set to be higher as change in static factor becomes greater. For example, an inner product of $N_1$-dimensional vectors $Q_1\hat{}(k)=(X_1(k), \ldots X_i(k), \ldots X_{N1}(k))$ and $Q_1\hat{}(m)=(X_1(m), \ldots X_i(m), \ldots X_{N1}(m))$, a deviation of a norm $|Q_1\hat{}(k)|-|Q_1\hat{}(m)|$ of vectors $Q_1\hat{}(k)$ and $Q_1\hat{}(m)$, or a norm $|Q_1\hat{}(k)-Q_1\hat{}(m)|$ of a vector $Q_1\hat{}(k)-Q_1\hat{}(m)$ is evaluated as change in static factor. With reference to plural links L(m), L(m+1), ... continued to the link L(k), a summation of the inner products $\Sigma Q_1\hat{}(k) \cdot Q_1\hat{}(m)$ of these plural links or an average value thereof, a summation of the norm deviations $\Sigma\{|Q_1\hat{}(k)|-|Q_1\hat{}(m)|\}$ or an average value thereof, or a summation of this norm $\Sigma\{|Q_1\hat{}(k)-Q_1\hat{}(m)|\}$ or an average value thereof is evaluated as change in static factor.

A static variable as a discrete variable representing one static factor among the plural static factors that causes a great impact to the driving difficulty level of the moving body may be define to have a greater space. A degree of the space of the static variable as a discrete variable may set depending on a user's will via the input unit 231 of the navigation client 2, and information regarding this setting may be transmitted from each navigation client 2 to the navigation server 1 and this setting information associated with the identifying information may be stored in the server storage unit 10. Through this, it is possible to evaluate change in static factor depending on the change of the above one static factor to be greater than change in static factor depending on changes of the other static factors. If plural links are continued from an end point (node) of the link L(k), a value of a correction coefficient a(k,m) of this link L(k) can be differentiated from each of these plural rinks.

Similarly, with reference to one link L(m) continued to the link L(k), the correction coefficient a(k,m) may be set to be higher as the change in dynamic factor becomes greater. For example, an inner product of $N_2$-dimensional vectors $Q_2\hat{}(k)=(Y_1(k), \ldots Y_j(k), \ldots Y_{N2}(k))$ and $Q_2\hat{}(m)=(Y_1(m), \ldots Y_j(m), \ldots Y_{N2}(m))$, a deviation of a norm $|Q_2\hat{}(k)|-|Q_2\hat{}(m)|$ of vectors $Q_2\hat{}(k)$ and $Q_2\hat{}(m)$, or a norm $|Q_2\hat{}(k)-Q_2\hat{}(m)|$ of a vector $Q_2\hat{}(k)-Q_2\hat{}(m)$ (or a summation of these plural links) is evaluated as change in dynamic factor. With reference to plural links L(m),L(m+1), ... continued to the link L(k), a summation of the inner product of these plural links $\Sigma Q_2\hat{}(k) \cdot Q_2\hat{}(m)$ or an average value thereof, a summation of the norm deviation $\Sigma\{|Q_2\hat{}(k)|-|Q_2\hat{}(m)|\}$ or an average value thereof, or a summation of this norm $\Sigma\{|Q_2\hat{}(k)-Q_2\hat{}(m)|\}$ or an average value thereof is evaluated as change in the static factor.

A dynamic variable as a discrete variable representing one dynamic factor among the plural dynamic factors that causes a great impact to the driving difficulty level of the moving body may be defined to have a greater space. A degree of the space of the dynamic variable as a discrete variable may set depending on a user's will via the input unit 231 of the navigation client 2, and information regarding this setting may be transmitted from each navigation client 2 to the navigation server 1 and this setting information associated with the identifying information may be stored in the server storage unit 10. Through this, it is possible to evaluate change in dynamic factor depending on the change of the above one dynamic factor to be greater than change in dynamic factor depending on changes of the other dynamic factors. If plural links are continued from the end point (node) of the link L(k), the correction coefficient a(k,m) of this link L(k) can be differentiated from each of these plural rinks.

Furthermore, as change in static factor and change in weighting of a dynamic factor become greater, the correction coefficient a(k,m) may be set to be higher. For example, a weighted summation $\alpha Q_1\hat{}(k) \cdot Q_1\hat{}(m)+(1-\alpha)Q_2\hat{}(k) \cdot Q_2\hat{}(m)(0<\alpha<1)$ of an inner product of an $N_1$-dimensional vector $Q_1\hat{}(k) \cdot Q_1\hat{}(m)$ and an inner product of an $N_2$-dimensional vector $Q_2\hat{}(k) \cdot Q_2\hat{}(m)$, a weighted summation $\beta(|Q_1\hat{}(k)|-|Q_1\hat{}(m)|)+(1-\beta)(|Q_2\hat{}(k)|-|Q_2\hat{}(m)|)(0<\beta<1)$ of a norm deviation of the $N_1$-dimensional vector $|Q_1\hat{}(k)|-|Q_1\hat{}(m)|$ and a norm deviation of the $N_2$-dimensional vector $|Q_2\hat{}(k)|-|Q_2\hat{}(m)|$, or a weighted summation $\beta(|Q_1\hat{}(k)-Q_1\hat{}(m)|)+(1-\beta)(|Q_2\hat{}(k)-Q_2\hat{}(m)|)$ of an $N_1$-dimensional vector norm $|Q_1\hat{}(k)-Q_1\hat{}(m)|$ and an $N_2$-dimensional vector norm $|Q_2\hat{}(k)-Q_2\hat{}(m)|$ may be evaluated as change in weighting.

Based on the above, the first moving cost $S_1(k)$ is multiplied by the above correction coefficient a(k) (or a(k,m)) so as to set this multiplication result to be a second moving cost $S_2(k)$ (or $C_2(k,m)$) in each link L(k).

In the navigation client 2 of interest, in response to setting of a destination point $p_2$ by the user via the input unit 231, the second client arithmetic processing element 22 transmits a route finding request to the navigation server 1 (STEP220 in FIG. 2). This request includes a starting point $p_1$ and the destination point $p_2$ of the navigation client 2 (precisely, coordinate values or link identifying information representing these points). A current point of the navigation client 2 at the time of setting the destination point $p_2$ or measured immediately before the this setting, or a point set by the user via the input unit 231 is used as the starting point $p_1$.

Figure 3:
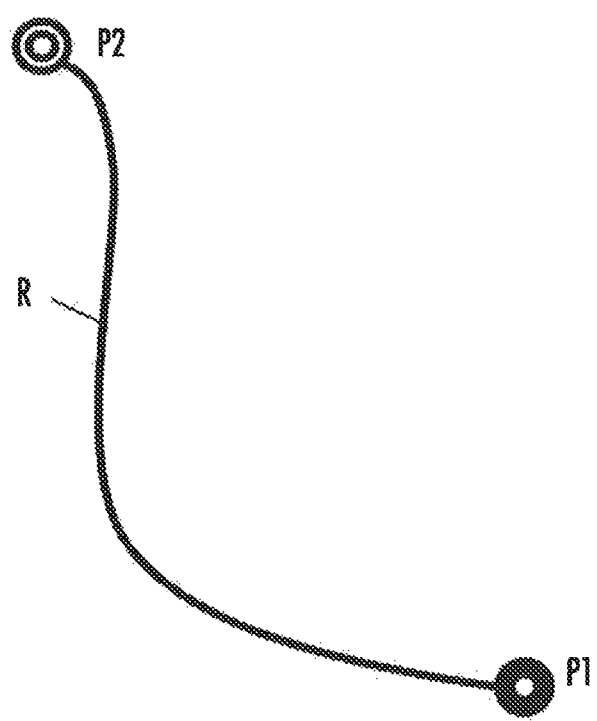
FIG. 3 is a drawing explaining a method of finding a server route.

In the navigation server 1, the second server arithmetic processing element 12 receives the above route finding request (STEP120 in FIG. 2). The second server arithmetic processing element 12 finds one or plural server routes R configured by plural groups of links that connect the starting point $p_1$ and the destination point $p_2$ of the navigation client 2 (STEP122 in FIG. 2). Through this, a server route R as shown in FIG. 3 is obtained as a result of the finding. During finding the assist route R, the server map information and the second moving cost $S_2(k)$ or $S_2(k,m)$ in each link L(k) are used. A route having a minimum total value of the second moving costs $S_2(k)$ or $S_2(k,m)$ is found as the server route R.

The second server arithmetic processing element 12 generates server route information representing the server route R, and transmits this information to the navigation client 2 (STEP124 in FIG. 2). The "server route information" includes link identifying information regarding at least part of a series of link groups configuring the server route R, or coordinate values of plural discrete points located on the server route R.

In the navigation client 2 of interest, the second client arithmetic processing element 22 receives the server route information (STEP222 in FIG. 2). The second client arithmetic processing element 22 calculates a client route r that connects the starting point $p_1$ (or a latest current point after the time of setting the destination point $p_2$) and the destination point $p_2$ based on the server route information and using the client map information, and outputs this client route r to the output unit 232 (STEP224 in FIG. 2).

Figure 4:
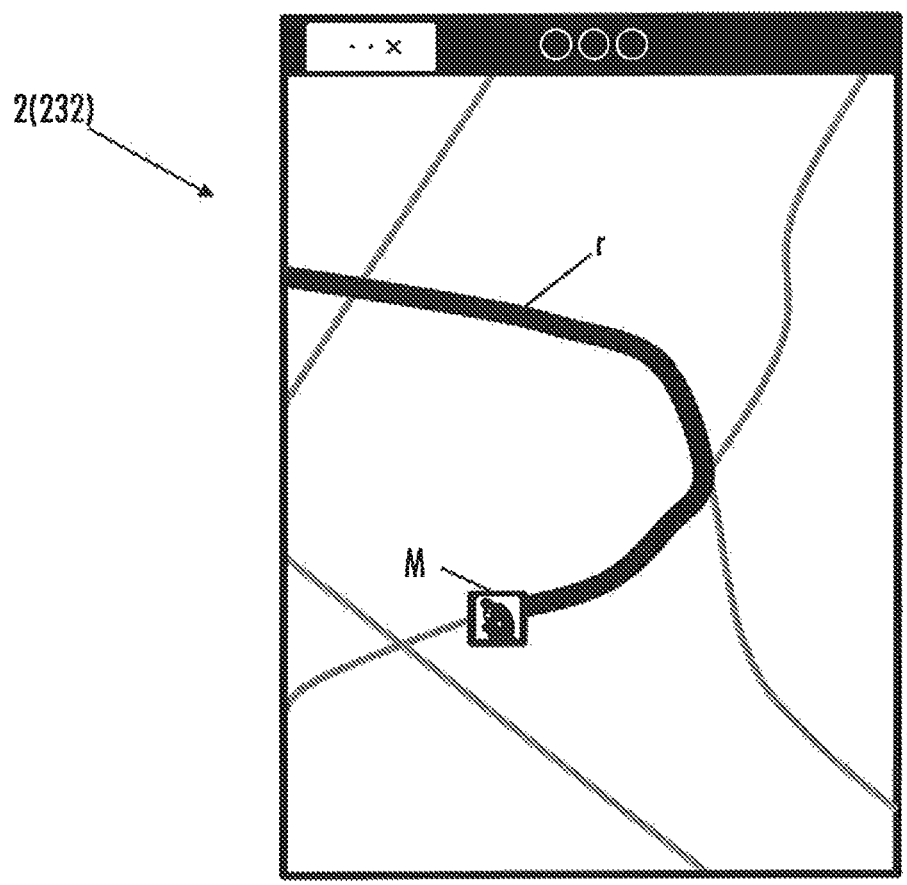
FIG. 4 is a drawing explaining an output pattern of a client route.

For example, there is found a client route r that includes plural points represented by links or coordinate values that are identified by the link identifying information included in the server route information (at least part of the server route R is reproduced). Through this, as shown in FIG. 4, the client route r is superimposed together with a label M indicating the current point $p_1$ of the navigation client 2 on a client map, and is displayed on a display screen included in the output unit 232.

Advantageous Effects

According to the navigation system and the navigation server 1 included in the navigation system as the first embodiment of the present invention, there is found the server route R that is configured by the link groups connecting the starting point $p_1$ and the destination point $p_2$ of the navigation client 2 of interest, and has a minimum total value $\Sigma C_2$ of the second moving costs $S_2$ in the link groups (see STEP122 in FIG. 2, and FIG. 3). The second moving cost $S_2$ results from correction of the first moving cost $S_1$ based on the combination of the "static factor" and the "dynamic factor" (see STEP116 in FIG. 2).

Hence, compared with the case of finding a server route having a minimum total value of only the first moving costs $S_1$, by comprehensively considering the static factors and the dynamic factors, it is possible to find a more proper server route R in light of driving facility when the user moves the moving body. The user is provided with the information regarding the above server route R through the navigation client, thereby promoting enhancement of convenience for the user to move the moving body (see STEP124 in FIG. 2, and FIG. 4).

Second Embodiment

In the navigation system as the second embodiment of the present invention, the server storage unit 10 of the navigation server 1 is configured to further store a first index value $C_1$ as a "factor". The first server arithmetic processing element 11 is configured to calculate second moving costs $S_2(k,C_1(i_1),C_1(i_2))$ considering the first index values $C_1$. The other configurations of the navigation system as the second embodiment of the present invention are the same as those of the navigation system of the first embodiment, and thus descriptions thereof will be omitted. In the following description, a reference numeral of the navigation client 2 of interest identified by client identifying information i is appropriately referred to as "2(i)".

The "first index value" is an index value representing a traffic difficulty level of a road of interest specified for the navigation client 2 or each moving body in which the navigation client 2 is installed. For example, the first index value $C_1(i)$ for the navigation client 2(*i*) is continuous variables or discrete variables. In the present embodiment, $N_1$ (e.g., $N_1$=5) discrete variables "1", "2", ... "$N_1$" defined to become greater as the driving difficulty level of the moving body becomes greater are defined as the first index value $C_1(i)$ of the navigation client 2(*i*) installed in the moving body. The number of the discrete variables may be set to be any number, and a definition range of the continuous variables may appropriately be set.

Based on a driving history (including a history of traffic accidents and driving years of the moving body, and violations of traffic laws, etc.) of the user corresponding to the client identifying information i, which is registered in a database server (not shown) or the server storage unit 10, the first index value $C_1(i)$ is specified in accordance with a predetermined rule by the first server arithmetic processing element 11. In this case, it is possible to improve a correlation between a degree of the first index value $C_1$ and a level of user's driving skill. Furthermore, it may be configured to specify the first index value $C_1(i)$ of the navigation client 2(*i*) depending on the user's will through user's operation of another information terminal communicable with the navigation client 2 or the navigation server 1.

(Functions)

Functions of the navigation system as the second embodiment of the present invention will be descried. In the first navigation client 2($i_1$), the first client arithmetic processing element 21 generates the probe information, and transmits this information to the navigation server 1 (STEP230 in FIG. 5). The "probe information" includes a time sequence of measurement results of a current position (or the link identifying information corresponding to this) of the first navigation client $2(i_1)$. For example, a current transmission of the probe information is triggered after a specified time period passes from a previous transmission of the probe information, when a moving distance of the moving body reaches a specified distance from the previous transmission of the probe information, or when an information volume of the probe information reaches a predetermined volume, etc., for example.

The "probe information" further includes the client identifying information to identify the first navigation client $2(i_1)$ or moving body identifying information to identify the moving body (first moving body) in which the first navigation client $2(i_1)$ is installed. The identifying information is used for identifying the first index value $C1(i_1)$ specified for the first navigation client $2(i_1)$ or the moving body in which the first navigation client $2(i_1)$ is installed.

Figure 5:
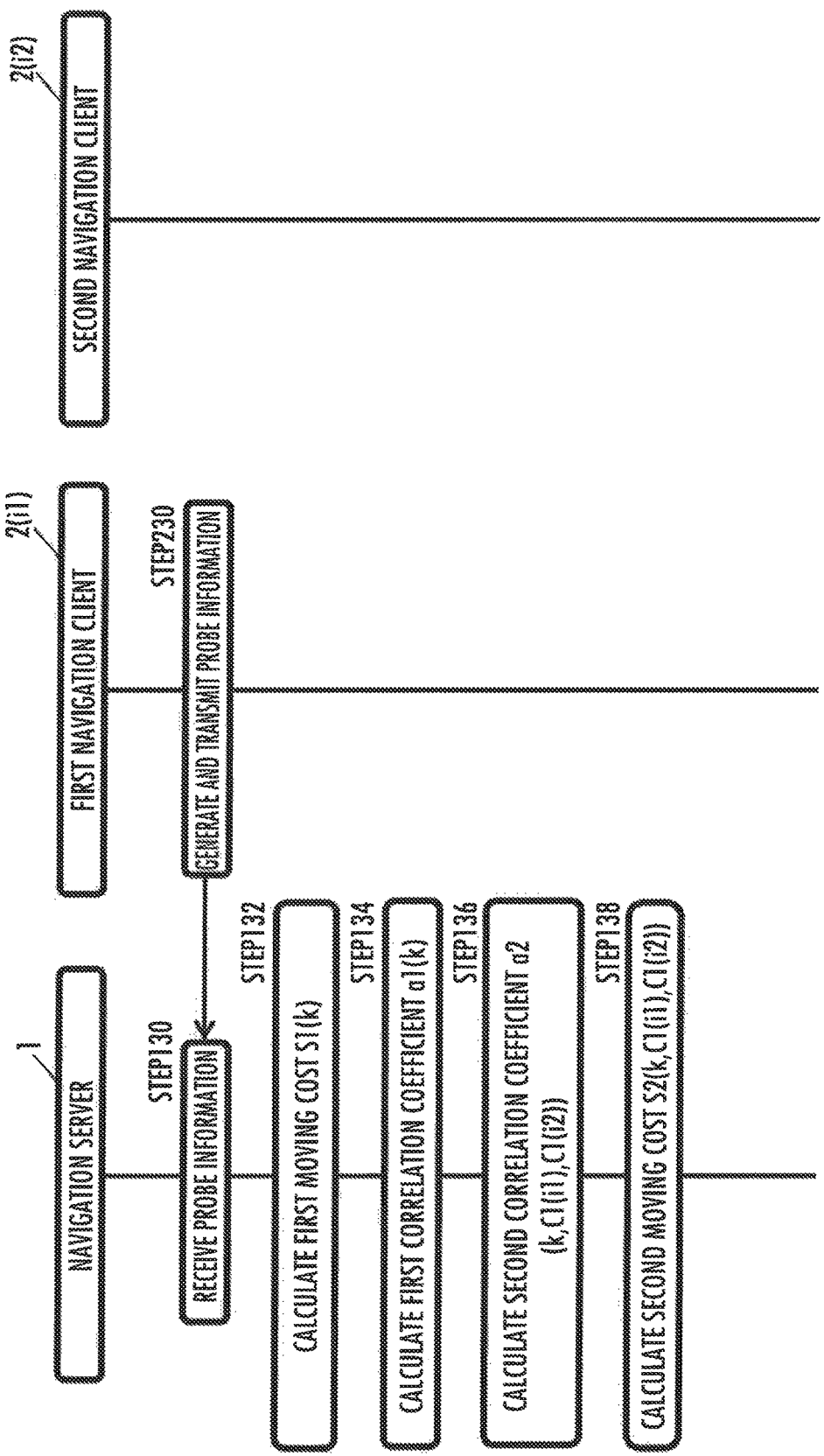
FIG. 5 is a drawing explaining functions of a navigation system according to a second embodiment.

In the navigation server 1, the first server arithmetic processing element 11 receives the probe information from the first navigation client $2(i_1)$ (STEP130 in FIG. 5). Based on the probe information accumulatively stored in the server storage unit 10, the first server arithmetic processing element 11 successively calculates or updates a first moving cost $S_1(k)$ in each link $L(k)$ (STEP132 in FIG. 5). Time required for moving, a moving distance, fuel consumption, electricity consumption, and or a toll charge fee that are measured in the link $L(k)$ or predicted based on the measurement results, or combinations of them are defined as the first moving cost $S_1(k)$ of this link $L(k)$. In calculation of the first moving cost $S_1(k)$, the road traffic information received by the navigation server 1 from the server (not shown) managed by the road traffic information center may additionally be used.

The first server arithmetic processing element 11 calculates or reads out a first correction coefficient $A_1(k)$ defined depending on the traffic difficulty level of the moving body belonging to an attribute of each link $L(k)$ from the server storage unit 10 (STEP134 in FIG. 5). Examples of the attribute of the link $L(k)$ may include static attributes having no uncertain changes or almost no uncertain changes, such as types of roads (classification into national roads, prefectural roads, and municipal roads) constituted by the links, road curvatures, road widths, the number of lanes, presence and types of lane marks, presence and types of road traffic signs, attributes of regions including the links (classification into urban districts, residential areas, farm lands, and forest lands), presence of crossing opposing lanes or crossing pedestrian crossings, or entering angles when the moving body enters other links continued to the above links from the above links, and presence of traffic signals at nodes coupled to the continued links. In addition, examples of the attribute of each link may also include dynamic attributes, such as presence of rains, snows, and frozen road surfaces or the like, intensity of ambient illumination (classification into day time and night time, and a cloudy weather and a rainy weather, etc.).

For each j-th attribute (j=12, . . . , N) of the link $L(k)$, there is defined a cost factor $c(k,j)$ that is a discrete variable or a continuous variable having a different value depending on the difference in degree, scale, content, or the like of the j-th attribute. If the j-th attribute belongs to an attribute increasing the driving difficulty level of the moving body (or an attribute requiring driver's strong concentration or causing a driver to feel a psychological stress), the cost factor $c(k,j)$ is defined to have a greater value than that in the case of not increasing the driving difficulty level. As the above difficulty level becomes higher, a value of the cost factor $c(k,j)$ is defined to become continuously or intermittently greater.

For example, if a first attribute is an attribute regarding a curvature of the link $L(k)$, a cost factor $c(k,1)$ of the link $L(k)$ is defined to have a greater value as this curvature becomes continuously or intermittently greater. If a second attribute is an attribute regarding a road width of the link $L(k)$, a cost factor $c(k,2)$ of the link $L(k)$ is defined to have a greater value as the road width becomes continuously or intermittently greater. If an i-th attribute of the link $L(k)$ is an attribute regarding presence of crossing an opposing lane or crossing a pedestrian crossing when the moving body moves from the link $L(k)$ to a next continuous link $L(k+1)$, in a situation of having the crossing (for example, corresponding to a situation of turning to the right at a crossroad or a T junction in Japan, or turning to the left at a crossroad or a T junction in the U.S.), the cost factor $c(k,i)$ of the link $L(k)$ is defined to have a greater value than that in a situation of having no crossing. If an i+1-th attribute \ is an attribute regarding an area in which the link $L(k)$ is located, and if this area is an urban district having a relatively large traffic volume, the cost factor $c(k,i+1)$ of the link $L(k)$ is defined to have a greater value than that in a farmland or the like having a relatively smaller traffic volume.

The first correction coefficient $A_1(k)=g(c(k,1), \ldots c(k,i), \ldots c(k,N))$ is defined as dependent variables (function) having N cost factors $c(k,i)$ of each link $L(k)$ as master variables. For example, the first correction coefficient $A_1(k)$ is defined as an increasing function of various factor, such as a product of N coefficients $c(k,1) \times \ldots c(k,i) \times \ldots c(k,N)$, a sum of N coefficients $c(k,1)+ \ldots c(k,i)+ \ldots c(k,N)$, or a weighted sum thereof.

Based on the probe information, and on the correlation between the first index values of the first navigation clients and any second navigation clients, the first server arithmetic processing element 11 calculates each second correction coefficient $A_2(k,C_1(i_1),C_1(i_2))$ (STEP136 in FIG. 5). Specifically, each traffic frequency $f(k,C_1(i_1))$ in the link $L(k)$ of the navigation clients 2 (first navigation clients) for which a first index value $C_1(i_1)(=1, 2, \ldots N_1)$ is specified is calculated. If the correlation between $C_1(i_1)$ and $C_1(i_2)$ is "common", "identical", or "approximate", each second correction coefficient $A_2(k,C_1(i_1),C_1(i_2))$ is defined to have a smaller value as the traffic frequency $f(k,C_1(i_1))$ becomes higher than that in the case in which this correlation is "different" or "not approximate (deviating)". For example, an exponentiation $B_1^f$ using a first correlation coefficient $B_1(C_1(i_1),C_1(i_2))$ representing a correlation between the respective first index values $C_1(i_1)$ and $C_1(i_2)$ as a base and using a traffic frequency $f(k,C_1(i_1))$ as an exponent (power) is calculated as the second correction coefficient $A_2(k,C_1(i_1),C_1(i_2))$.

For example, as shown in FIG. 4, the first correlation coefficient $B_1$ with $N_1=3$ is defined to be "$1-\alpha_{xy}(0<\alpha_{xy}<1$, x=1,2,3, y=1,2,3, x=y)" if the first index values $C_1(i_1)$ and $C_1(i_2)$ are identical, and to be "1" if $C_1(i_1)$ and $C_1(i_2)$ are different. Hence, if $C_1(i_1)$ and $C_1(i_2)$ are common (if $C_1(i_2)$ is within a predetermined range compared with $C_1(i_1)$), the second correction coefficient $A_2(k,C_1(i_1),C_1(i_2))$ (e.g., $(1-\alpha_{xy})^f$) becomes smaller as the traffic frequency $f(k,C_1(i_1))$ becomes higher. All values of $\alpha_{xy}$ may be identical, but may be different, such as $\alpha_{33}<\alpha_{22}<\alpha_{11}$, depending on the combination of x and y.

If a difference (absolute value) between the first index values $C_1(i_1)$ and $C_1(i_2)$ is not more than a reference value (e.g., 0.1, 0.2, 0.25, etc.), it may be determined that $C_1(i_1)$ and $C_1(i_2)$ are common, and if the difference between the first index values $C_1(i_1)$ and $C_1(i_2)$ is more than the reference value, it may be determined that $C_1(i_1)$ and $C_1(i_2)$ are different from each other ($C_1(i_2)$ is out of the predetermined range compared with $C_1(i_1)$). In this case, that "$C_1(i_2)$ is within the predetermined range compared with $C_1(i_1)$" includes a concept that "$C_1(i_1)$ and $C_1(i_2)$ are approximate to each other in a first mode".

The difference between the first index values $C_1(i_1)$ and $C_1(i_2)$ that are continuous variables or discrete variable is represented by a ratio of a deviation between the first index values $C_1$ relative to a width of a definition range of the above continuous variables, or relative to the number $N_1$ of the above discrete variables. For example, if the number $N_1$ of the first index value $C_1$ (discrete variables) is "3", and the deviation of the first index values $C_1(i_1)$–$C_1(i_2)$ is "1", the difference mode is defined to be "⅓(=0.33 . . . )". If the width of the definition range of the first index values $C_1$ (continuous variables) is "40", and the deviation of the first index values $C_1(i_1)$–$C_1(i_2)$ is "15", the difference mode is defined to be "15⁄40(=0.375)". The first index values $C_1(i_1)$ and $C_1(i_2)$ is defined by 1 and the deviation of the difference, for example.

The first server arithmetic processing element 11 multiplies the first moving cost $S_1(k)$ of each link $L(k)$ by the first correction coefficient $A_1(k)$ and the second correction coefficient $A_2(k,C_1(i_1),C_1(i_2))$, thereby calculating a second moving cost $S_2(k,C_1(i_1),C_1(i_2))$ of each link $L(k)$ (STEP138 in FIG. 5).

Subsequently, the same processing as the processing of STEP220→STEP120→STEP122→STEP124→STEP222→STEP224 in FIG. 2 is executed between the navigation server 1 and the second navigation client 2($i_2$) ($i_2$=m) of interest. Through this, as shown in FIG. 4, the client route r is superimposed together with the label M indicating the current point $p_1$ of the navigation client 2 of interest on the client map, and is displayed on the display screen included in the output unit 232.

(Operation and Effects)

According to the navigation system and the navigation server 1 included in this navigation system as the second embodiment of the present invention, based on the traffic frequency $f(k,C_1(i_1))$ of the link $L(k)$ included in each specified navigation client among the first navigation clients 2($i_1$) that has a different first index value $C_1$, compared with the first index value $C_1$ of each second navigation client 2($i_2$), the first moving cost $S_1$ of the link $L(k)$ is corrected, and the second moving cost $S_2$ is set to be a smaller value as the traffic frequency $f(k,C_1(i_1))$ becomes higher (see STEP136 and STEP138 in FIG. 5).

For example, considered is the case in which the first correlation coefficient $B_1(C_1(i_1),C_1(i_2))$ is defined as shown in FIG. 4, and "3" is specified as the first index value $C_1(i_2)$ for the second navigation client 2($i_2$) of interest. In this case, in comparison among the first index values $C_1(i_1)$ in the link $L(k)$, as a navigation client 2($i_d$) for which "3" is specified, which is within the predetermined range (corresponding to a "specified client"), has a higher traffic frequency $f(k,C_1(i_d))$, a calculation value of the second correction coefficient $A_2(k,C_1(i_1),C_1(i_2))$ becomes greater.

Accordingly, compared with a second moving body (one moving body in which the second navigation client 2($i_2$) is installed), the link $L(k)$ where the first moving body (another moving body in which the first navigation client 2($i_1$) is installed) having a different specified driving difficulty level frequently travels is preferentially reflected on a second information in light of reduction of the second moving cost $S_2(k,C_1(i_1),C_1(i_2))$; and based on this reflection, the movement of the second moving body may be assisted.

Third Embodiment

Configuration

In a navigation system as the third embodiment of the present invention, the server storage unit 10 of the navigation server 1 is configured to further store second index values $C_2$ as "factors". The first server arithmetic processing element 11 is configured to calculate a second moving cost $S_2(k,C_1(i_1),C_1(i_2),C_2(i_1))$ with consideration of the second index value $C_2$ in addition to the first index value $C_1$. The other configuration of the navigation system as the third embodiment of the present invention are the same as those of the navigation system as the second embodiment of the present invention, and thus description thereof will be omitted.

A second index value $C_2(i_1)$ is an index value representing a comprehensive traffic difficulty level of link groups having traffic histories of the first navigation client 2($i_1$) of interest. An increasing function of the first correction coefficients $A_1(k)$, such as a product, a sum, or a weighted sum (weigh is a traffic frequency $f(k,C_1(i_1))$) of the first correction coefficients $A_1(k)$ of the link groups, is defined as an index value. Within $N_2$ (e.g., $N_2$=3) numerical ranges defined by dividing a definition range of an index value, discrete variables "1","2", . . . "$N_2$" representing one numerical range including the above index value are defined as a second index value $C_2(i_1)$ of the first navigation client 2($i_1$) of interest. The above index value itself may be defined as the second index value $C_1(i_1)$.

(Functions)

The navigation system as the third embodiment of the present invention will be described. A difference from the second embodiment is only a calculating method of a second correction coefficient $A_2$, and thus, only this difference will be described (see STEP136 in FIG. 5).

In addition to the probe information, and a correlation between the respective first index values $C_1(i_1)$ and $C_1(i_2)$ of the first navigation client of interest and any second navigation client 2($i_2$), based on a correlation between a first index value $C_1(i_1)$ and a second index value $C_2(i_1)$ of the first navigation client of interest, the first server arithmetic processing element 11 calculates a second correction coefficient $A_2(k,C_1(i_1),C_1(i_2),C_2(i_1))$. Specifically, if the correlation between the first index value $C_1(i_1)$ and the second index value $C_2(i_1)$ that are specified for the navigation clients 2 (first navigation clients) is "common", the second correction coefficient $A_2(k,C_1(i_1),C_1(i_2),C_2(i_1))$ is defined to be a smaller value as the traffic frequency $f(k,C_1(i_1))$ becomes higher than that in the case in which this correlation is "different". For example, a second correlation coefficient $B_2(C_1(i_1),C_2(i_1))$ representing a correlation between the first index value $C_1(i_1)$ and the second index value $C_2(i_1)$ is defined.

An exponentiation $((B_1 \times B_2)^f, (B_1+B_2)^f$ or $(\eta B_1+(1-\eta)B_2)^f$ $(0<\eta<1)$, etc.) using, as a base, an increasing function of the second correlation coefficient $B_2$, such as a product, a sum, and a weighted sum of the first correction coefficient $B_1(C_1(i_1),C_1(i_2))$ and the second correction coefficient $B_2(C_1(i_1),C_2(i_1))$, and using the traffic frequency $f(k,C_1(i_1))$ as an exponent (power) is calculated as the second correction coefficient $A_2(k,C_1(i_1),C_1(i_2),C_2(i_1))$.

If a difference (absolute value) between the first index value $C_1(i)$ and the second index value $C_2(i)$ is not more than a reference value (e.g., 0.1, 0.2, 0.25, etc.), it may be determined that $C_1(i)$ and $C_2(i)$ are common ($C_2(i)$ is within a predetermined range compared with the $C_1(i)$); and if the difference is more than the reference value, it may be determined that $C_1(i)$ and $C_2(i)$ are different ($C_2(i)$ is out of the predetermined range compared with the $C_1(i)$). In other words, that "$C_1(i)$ is within the predetermined range compared with $C_1(i)$" includes a concept that "$C_1(i)$ and $C_1(i)$ are approximate to each other in a second mode".

The difference between the first index value $C_1(i)$ and the second index value $C_2(i)$ that are continuous variables or discrete variables is represented by a ratio of a deviation between a ratio of the first index value $C_1(i)$ relative to a width of a definition range of the first index value $C_1(i)$ (if the first index value $C_1(i)$ is continuous variables), or relative to the number $N_1$ of the first index value $C_1(i)$ (if the first index value $C_1(i)$ is discrete variables), and a ratio of the second index value $C_2(i)$ relative to a width of a definition range of the second index value $C_2(i)$ (if the second index value $C_2(i)$ is continuous variables), or relative to the number $N_2$ of the second index value $C_2(i)$ (if the second index value $C_2(i)$ is discrete variables). An approximation between the first index values $C_1(i)$ and $C_2(i)$ is defined by 1 and the deviation of the difference.

For example, if the number $N_1$ of the first index value $C_1$ (discrete variable) is "3", and the first index value $C_1(i)$ is "1", and also if the number $N_2$ of the second index value $C_2$ (discrete variables) is "5", and the second index value $C_2(i)$ is "1", the difference is defined to be "(⅓)−(⅕)(=0.133 . . . )". If the width of the definition range of the first index value $C_1$ (continuous variables) is "40", and the first index value $C_1(i)$ is "15", and also if the width of the definition range of the second index value $C_2$ (continuous variables) is "30", and the second index value $C_2(i)$ is "24", the difference is defined to be "(15/40)−(24/30)(=−0.425)".

As shown in FIG. 7A, the second correction coefficient $B_2$ having $N_1$=3 and $N_2$=3 is defined to be "1" if the first index value $C_1(i_1)$ and the second index value $C_2(i_1)$ coincide with each other, and this second correction coefficient $B_2$ is defined to be "$1-\beta_{xz}(0<\beta_{xz}<1, x=1,2,3, z=1,2,3, x\neq z)$" if $C_1(i_1)$ and $C_2(i_1)$ are different from each other. Hence, if $C_1(i_1)$ and $C_2(i_1)$ are different from each other, the second correction coefficient $A_2(k,C_1(i_1),C_1(i_2),C_2(i_1))$ e.g., $\{(1-\alpha_{xy})\times(1-\beta_{xz})^f\}$ becomes smaller as the traffic frequency $f(k,C_1(i_1))$ becomes higher.

The second correction coefficient $B_2$ may be differentiated depending on the approximation mode (or degree of the approximation) between the first index value $C_1(i_1)$ and the second index value $C_2(i_1)$. For example, if the number $N_1$ of the first index value $C_1$ (discrete variables) is "3", if the number $N_2$ of the second index value $C_2$ (discrete variables) is "5", and also if the reference value is "0.3", the second correction coefficient $B_2$ may be defined as shown in FIG. 7B. The second correction coefficient $B_2$ is defined to be "$1-\beta_{xz}(0<\beta_{xz}<1, (x,y)=(1,1), (2,1), (2,2), (3,1), (3,2), (4,2), (4,3), (5,1))$" if the deviation between the first index value $C_1(i_1)$ and the second index value $C_2(i_1)$ is not more than the reference value of 0.3; or otherwise, the second correction coefficient $B_2$ is defined to be "1". Each value of $\beta_{xz}$ may be identical, but may be different depending on the combination of x and z, on a value of a deviation x-z, or on whether the deviation x-z is a positive value or a negative value. Hence, if $C_1(i_1)$ and $C_2(i_1)$ are approximate to each other in the second mode (such as a mode having a deviation of not more than "0.3"), the second correction coefficient $A_2(k,C_1(i_1),C_1(i_2),C_2(i_1))$ (e.g., $\{(1-\alpha_{xy})\times(1-\beta_{xz})^f\}$ becomes smaller as the traffic frequency $f(k,C_1(i_1))$ becomes higher. The second mode may be identical to, or may be different from the first mode.

Advantageous Effects

According to the navigation system and the navigation server 1 included in this navigation system as the third embodiment of the present invention, among the specified navigation clients, as the traffic frequency $f(k,C_2(i_1))$ of the link $L(k)$ of each specified navigation client that has a difference between a specified traffic difficulty level of the first moving body (first index value $C_1$), and a comprehensive traffic difficulty level of the link groups where the first moving body has actually been traveled (second index value $C_2$) becomes higher, the second moving cost $S_2(k,C_1(i_1),C_1(i_2),C_2(i_1))$ of the link $L(k)$ is set to be a further smaller value.

For example, there is considered the case in which the second correlation coefficient $B_2(C_1(i_1),C_2(i_1))$ is defined as shown in FIG. 7A, and "3" is specified as the first index value $C_1(i_1)$ for the first navigation clients 2$(i_1)$. In this case, compared with the second index value $C_2(i_1)$ in the link $L(k)$, as the traffic frequency $f(k,C_1(i_d))$ of a navigation client 2$(i_d)$ for which "3" is specified within the predetermined range (corresponding to a "specified client") becomes higher, a calculated value of the second correction coefficient $A_2(k,C_1(i_1),C_1(i_2),C_2(i_1))$ becomes greater.

There is considered the case in which the second correction coefficient $B_2(C_1(i_1),C_2(i_1))$ is defined as shown in FIG. 7B, and "3" is specified as the first index value $C_1(i_1)$ for the first navigation clients 2$(i_1)$. In this case, as the traffic frequency $f(k,C_1(i_1))$ of each navigation client 2 for which "2", "3", or "4" approximate in the second mode to the second index value $C_2(i_1)$ in the link $L(k)$ is specified (corresponding to a "specified client") becomes higher, a calculated value of the second correction coefficient $A_2(k,C_1(i_1),C_1(i_2),C_2(i_1))$ becomes greater.

Through this, it is possible to promote enhancement of usefulness of the traffic history of the specified navigation clients 2$(i_1)$ when the movement of the second navigation clients 2$(i_2)$ is assisted.

Other Embodiments of the Present Invention

In the navigation system as the first embodiment of the present invention, it may be configured that a latest dynamic factor is recognized in response to reception of the route finding request, and based on this, the second moving cost $S_2$ is set, and the server route R is found based on the second moving cost $S_2$. In other words, the arithmetic processing may be executed in the order of STEP120→STEP114→STEP116→STEP122 in FIG. 2.

In the navigation system as the first embodiment of the present invention, as a setting base of the second moving cost $S_2(k,m)$ of each link $L(k)$ with reference to continuous links, either one of specification for change in dynamic factor and specification for respective changes in dynamic factor and static factor may be included in the route finding request (STEP220 in FIG. 2). If the second moving cost $S_2(k,m)$ is set based on the change in static factor and the change in weighting of the dynamic factor, specification for a weighting coefficient α (or β) may be included in the route finding request. This specification is given depending on the user's will through the input unit 231 of each navigation client 2.

In the navigation system as the second embodiment or the third embodiment of the present invention, the first index value $C_1(i)$ of the navigation client $2(i)$ may be specified for each attribute of the link $L(k)$. An inner product $C_1(i_1) \cdot C_1(i_2)$ of the first index value vector $C_1(i_1)=(C_1(i_1,1), \ldots C_1(i_1,j), \ldots C_1(i_1,N))$ of the first navigation client $2(i_1)$ and the first index value vector $C_1(i_2)=(C_1(i_2,1), \ldots C_1(i_2,j), \ldots C_1(i_2,N))$ of the second navigation client $2(i_2)$, or an increasing function of this inner product, or a decreasing function of the norm deviation $|C_1(i_1)|-|C_1(i_2)|$ may be calculated as a degree of an approximation (approximation mode) of each first index value of the first navigation client $2(i_1)$ and the second navigation client $2(i_2)$.

In the navigation system as the second embodiment or the third embodiment of the present invention, of the norm $|C_1(i)|$ of the first index value vector $C_1(i)$ and a numeric range of $N_1$ defined by dividing this definition range, discrete variables $1, 2, \ldots N_1$ representing one range including this norm $|C_1(i)|$ may be defined as the first index value $C_1$.

In the navigation system as the second embodiment or the third embodiment of the present invention, the second index value $C_2(i)$ of each navigation client $2(i)$ may be specified for each attribute of the link $L(k)$. An inner product $C_1(i_1) \cdot C_2(i_1)$ of the first index value vector $C_1(i_1)=(C_1(i_1,1), \ldots C_1(i_1,j), \ldots C_1(i_1,N))$ and the second index value vector $C_2(i_1)=(C_2(i_1,1), \ldots C_2(i_1,j), \ldots C_2(i_1,N))$ of the first navigation client $2(i_1)$ of interest, or an increasing function of this inner product, or a decreasing function of the norm deviation $|C_1(i_1)|-|C_1(i_2)|$ may be calculated as a degree of an approximation (approximation mode) of the first index value $C_1(i_1)$ and the second index value $C_2(i_1)$ of the first navigation client $2(i_1)$.

In the navigation system as the second embodiment or the third embodiment of the present invention, the second moving cost $S_2$ may be calculated without considering the first correction coefficient $A_1$. In this case, the second moving cost $S_2(k,C_1(i_1),C_1(i_2))$ (or $S_2(k,C_1(i_1),C_1(i_2),C_2(i_1))$) is calculated by multiplying the first moving cost $S_1(k)$ by the second correction coefficient $A_2$.

In the navigation system as the second embodiment or the third embodiment of the present invention, the request information may include a specification for the approximation mode (first mode) between the first index value $C_1(i_1)$ of each first navigation client $2(i_1)$ and the second index value $C_1(i_2)$ of each of any second navigation clients $2(i_2)$. The request information may include a specification for the approximation mode (second mode) between the first index value $C_1(i_1)$ and the second index value $C_2(i_1)$ of each first navigation client $2(i_1)$. At least one of the first mode and the second mode may be defined depending on either one of, or both of the starting point $p_1$ and the destination $p_2$ included in the request information. For example, based on a length of a straight distance between the starting point $p_1$ and the destination $p_2$, or based on the attribute of a region in which the point $p_1$ and the destination $p_2$ are located (classification into an urban district or suburbs), the first mode or the second mode, or both the first mode and the second mode may be determined in accordance with a predetermined rule.

What is claimed is:

1. A navigation server comprising:
    a server storage unit which stores server map information regarding roads described by plural links, and respective first moving costs of the plural links,
    a first server arithmetic processing element that receives first information including a time sequence of a location of a first navigation client of a plurality of navigation clients from the first navigation client, calculates first moving costs using the first information, and correlates the first moving costs stored in the server storage unit based on client identification with respective driving difficulty levels of the plural links so as to set second moving costs;
    a second server arithmetic processing element that generates second information to assist in moving of a second navigation client of the plural navigation clients by using the first moving costs calculated by the first server arithmetic processing element, and transmits the server map information stored in the server storage unit, information based on the second moving costs set by the first server arithmetic processing element, and the second information to the second navigation client;
    wherein the server storage unit is configured to store first index values, a degree of each first index value correlating with a level of user's driving skill thereby causing the first index values to be the factors representing respective driving difficulty levels of the roads for each user, the first index values being specified for each of the plural navigation clients or for each of moving bodies in which the plural navigation clients are installed;
    wherein the first server arithmetic processing element defines a traffic frequency depending on the first information in each of the plural links of each specified navigation client among the first navigation clients that has the first index value within a first predetermined range compared with that of each second navigation client;
    wherein the first server arithmetic processing element further corrects the first moving cost, setting the second moving cost in each of the plural links to be a smaller value as the traffic frequency becomes higher wherein the first index value is within a second predetermined range associated with a comprehensive traffic difficulty level;
    wherein the server storage unit is configured to store second index values for each of the first navigation clients as the factors defined based on differences in attribute among the plural links, the factors representing comprehensive traffic difficulty levels of link groups having traffic histories; and
    wherein the first server arithmetic processing element sets the second moving cost for each of the plural links of each specified navigation client of which first index values are common in comparison with the second index values among the specified navigation clients to be a smaller value as the traffic frequency in each of the plural links becomes higher.

2. The navigation server according to claim 1, wherein
    the first server arithmetic processing element recognizes, as the factors, static factors inherent to the respective plural links and dynamic factors dynamically changing depending on change in environments of the respective plural links, and based on the recognition, the first server arithmetic processing element corrects the first moving costs stored in the server storage unit based on combination modes between the static factors and the dynamic factors so as to set the second moving costs, and
    based on the server map information stored in the server storage unit and the second moving costs set by the first server arithmetic processing element, the second server arithmetic processing element finds a server route configured by link groups connecting a starting point and a destination point of the navigation client, the server route having a minimum total value of the second moving costs in the link groups, and transmits information regarding the server route to the navigation client.

3. The navigation server according to claim 2, wherein with reference to one link or a plurality of links continued to each of the plural links, the first server arithmetic processing element corrects the first moving costs for the respective plural links in such a manner that the second moving costs become higher as the change in dynamic factors become greater.

4. The navigation server according to claim 3, wherein with reference to one link or a plurality of links continued to each of the plural links, the first server arithmetic processing element corrects the first moving costs for the respective plural links in such a manner that the second moving costs become higher as the change in static factors become greater.

5. The navigation server according to claim 4, wherein the first server arithmetic processing element corrects the first moving costs in such a manner that the second moving costs become higher as change in weighting of the static factors and dynamic factors becomes greater.

6. The navigation server according to claim 1, wherein the server storage unit is configured to store the traffic difficulty levels according to the differences in attribute among the plural links, and the first server arithmetic processing element sets the second moving cost to be a higher value as the traffic difficulty level belonging to the attribute of each of the plural links becomes higher.

7. The navigation server according to claim 1, wherein the first moving cost includes time required for moving, a moving distance, fuel consumption, electricity consumption, a toll charge fee, or a combination thereof in each of the plural links of a moving body in which each navigation client is installed.

8. The navigation server according to claim 1, wherein the second moving cost is defined as a multiplied result between the first moving cost and a correction coefficient, and the correction coefficient is set in accordance with a multivariable function having elements of vectors representing the factors as master variables.

9. The navigation server according to claim 2, wherein the static factor includes at least one of a type of a road, a width of a link, a number of lanes, presence of an opposing lane, presence of a structure on a roadside, presence of crossing an opposite lane or turning to the right or left when entering a subsequent link, and an amount of road traffic signs or road traffic rules.

10. The navigation server according to claim 2, wherein the dynamic factor includes at least one of a weather condition, classification of seasons, and a time zone of a day.

11. A navigation system comprising:
the navigation server according to claim 1, and
a navigation client which has a function of receiving the information, and then outputting the information.

* * * * *